US008165753B2

(12) United States Patent
Shoda et al.

(10) Patent No.: US 8,165,753 B2
(45) Date of Patent: Apr. 24, 2012

(54) VEHICLE OPERATION ASSISTING SYSTEM

(75) Inventors: Yasushi Shoda, Wako (JP); Kenichi Ohshima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/768,874

(22) Filed: Apr. 28, 2010

(65) Prior Publication Data

US 2010/0211257 A1 Aug. 19, 2010

Related U.S. Application Data

(62) Division of application No. 11/474,511, filed on Jun. 26, 2006, now Pat. No. 7,734,418.

(30) Foreign Application Priority Data

Jun. 28, 2005 (JP) ................................ 2005-188130
Jun. 28, 2005 (JP) ................................ 2005-188131
Jul. 4, 2005 (JP) ................................ 2005-194671
Mar. 23, 2006 (JP) ................................ 2006-080914
Mar. 24, 2006 (JP) ................................ 2006-082417

(51) Int. Cl.
*A01B 69/00* (2006.01)

(52) U.S. Cl. ........................... 701/41; 701/301; 180/6.2

(58) Field of Classification Search .................... 701/41, 701/72, 301; 180/602, 234, 408, 410, 443; 280/14.28
See application file for complete search history.

(56) References Cited

U.S. PATENT DOCUMENTS 5,703,775 A 12/1997 Yamamoto et al.
5,948,027 A 9/1999 Oliver et al.
6,101,434 A 8/2000 Irie et al.
6,317,693 B2 * 11/2001 Kodaka et al. ................ 701/301
6,338,022 B1 1/2002 Shinmura et al.
6,405,113 B1 * 6/2002 Yamawaki et al. ............. 701/41
6,823,245 B2 * 11/2004 Sugitani et al. ................. 701/29
7,035,726 B2 * 4/2006 Sakata ............................ 701/72
7,125,364 B2 * 10/2006 Cring ............................ 477/174
7,406,373 B2 * 7/2008 Kubota et al. ................... 701/41
2001/0003810 A1 * 6/2001 Shinmura et al. ............. 701/301
2001/0016798 A1 * 8/2001 Kodaka et al. ................ 701/301
2002/0156580 A1 * 10/2002 Matsuura ...................... 701/301
2002/0156581 A1 * 10/2002 Matsuura ...................... 701/301
2004/0016294 A1 * 1/2004 Sugitani et al. ................. 73/146
2004/0133324 A1 * 7/2004 Yasui et al. ..................... 701/41
2004/0148077 A1 * 7/2004 Yasui et al. ..................... 701/41
2004/0238265 A1 * 12/2004 Tsuchiya ...................... 180/446
2005/0049769 A1 * 3/2005 Tsuchiya ........................ 701/41
(Continued)

FOREIGN PATENT DOCUMENTS

DE 19751227 9/1998
(Continued)

*Primary Examiner* — Helal A Algahaim
(74) *Attorney, Agent, or Firm* — Arent Fox LLP

(57) ABSTRACT

When a collision avoidance operation determiner determines a collision avoidance operation by a driver, a target assist electrical current calculator calculates a target assist electrical current based on a deviation between a standard yaw rate corrected in accordance with avoidance momentum calculated by an avoidance momentum calculator and an actual yaw rate; and the target assist electrical current is supplied to a steering actuator to assist the collision avoidance operation by the driver. At this time, when an under-steer determiner determines an under-steer state, an assist electrical current is decreased by a reaction force electrical current calculated in a reaction force electrical current calculator. Therefore, a steering angle is prevented from becoming too large due to excessive assist, thereby facilitating a return operation after avoiding an obstacle.

4 Claims, 15 Drawing Sheets

U.S. PATENT DOCUMENTS

2005/0109556 A1* 5/2005 Kubota et al. .................. 180/446
2005/0203705 A1* 9/2005 Izumi et al. .................. 701/301
2005/0236223 A1* 10/2005 Yokota .......................... 180/446
2006/0259222 A1* 11/2006 Farrelly et al. .................. 701/42

FOREIGN PATENT DOCUMENTS

JP 08-263794 10/1996
JP 10-316001 A 12/1998
JP 11-078939 A 3/1999
JP 11-078951 3/1999
JP 11-348799 12/1999
JP 2000-043741 2/2000
JP 2000-72021 3/2000
JP 2000072021 3/2000
JP 2004-352031 12/2004
JP 2006-297983 A 11/2006

* cited by examiner

VEHICLE OPERATION ASSISTING SYSTEM

CROSS-REFERENCE TO RELATED APPLICATION

This application is a divisional application of U.S. patent application Ser. No. 11/474,511, filed Jun. 26, 2006, which claims priority to Japanese application Nos. 2005-188130, 2005-188131, 2005-194671, 2006-080914 and 2006-82417. The disclosures of the above-recited prior applications are hereby incorporated by reference in their entirety.

BACKGROUND OF THE INVENTION

1. Field of the Invention

The present invention relates to a vehicle operation assisting system that assists a collision avoidance operation which a driver performs to avoid collision with an obstacle during traveling of a vehicle.

2. Description of the Related Art

Japanese Patent Application Laid-open No. 11-348799 discloses a device which can effectively perform, in combination, avoidance of collision by automatic braking and avoidance of collision by a steering operation. Specifically, a control is performed to increase turn round ability of a vehicle to avoid an obstacle if there is a space for avoidance ahead of an own vehicle, and another control is performed to increase stability of the vehicle by giving up avoiding the obstacle if there is no space for avoidance ahead of the own vehicle, in the case where a steering operation by a driver is performed during automatic braking of the vehicle and the obstacle can be avoided by a turn round ability increasing control by vehicle behavior control means.

When a vehicle is brought into an under-steer state, and the driver increases the turn of a steering wheel to further turn around the vehicle, the steering operation of the driver is assisted by a steering actuator. However, if the driver performs a large and abrupt steering operation to avoid collision with an obstacle when the vehicle is in the under-steer state, excessive assist is performed due to the under-steer state and the steering angle becomes too large, leading to a possibility that the return operation after avoiding an obstacle becomes difficult.

Japanese Patent Application Laid-open No. 2004-352031 discloses a device which informs a driver that a vehicle approaches the turning limit by inhibiting increase of assist torque or decreasing the assist torque in accordance with the degree of the under-steer and the vehicle speed, when the vehicle approaches the turning limit of the under-steer and there is a fear of disturbing the vehicle behavior if the turn of the steering wheel is increased; and which suppresses increase of turn of the steering wheel to prevent disturbance of vehicle behavior.

In the above-described conventional devices, correction of the assist torque is not made in the over-steer state, and therefore, there is a possibility of the driver feeling a sense of discomfort; and when the avoidance operation of an obstacle is performed, there is a possibility that steering reaction force becomes large to inhibit a quick avoidance operation.

Japanese Patent Application Laid-open No. 2000-72021 discloses a power steering control device which controls a assist force for steering a vehicle in accordance with the traveling state. In this device, the assist force applied to steering in the direction opposite from the target steering angle direction is set to be small as compared with the assist force applied to steering in the target steering angle, thereby suppressing steering in the direction opposite from the target steering angle direction to prevent the vehicle from deviating from the road.

In a vehicle operation assisting device which assists a steering operation of a driver by operating a steering actuator, when the driver abruptly operates a steering wheel to perform collision avoidance as the vehicle almost contacts an obstacle, if excessive assist is performed by the steering actuator, there is a possibility that the steering-wheel turning becomes excessively smooth to induce disturbance of vehicle behavior and gives a feeling of discomfort to the driver.

SUMMARY OF THE INVENTION

The present invention is made in view of the above described circumstances, and has a first object to prevent a steering angle from becoming too large by excessive assist when a steering operation is performed for collision avoidance, and facilitate a return operation.

The present invention has a second object to provide required assist torque when performing an operation of avoiding an obstacle while minimizing a feeling of discomfort of a driver due to assist torque of a vehicle operation assisting device.

The present invention has a third object to prevent steering-wheel turning from becoming too smooth due to excessive assist when a vehicle almost contacts an obstacle, in the vehicle operation assisting device that assists a steering operation of the driver.

In order to achieve the first object, according to a first feature of the present invention, there is provided a vehicle operation assisting system that assists a collision avoidance operation which a driver performs to avoid collision with an obstacle during traveling of a vehicle, comprising: standard yaw rate calculating means that calculates a standard yaw rate of the vehicle; collision avoidance operation determining means that determines the collision avoidance operation by the driver; obstacle detecting means that detects an obstacle with which an own vehicle has a chance of colliding; avoidance momentum calculating means that calculates avoidance momentum necessary for avoiding the obstacle detected by the obstacle detecting means, when the collision avoidance operation determining means determines the collision avoidance operation by the driver; standard yaw rate correcting means that corrects the standard yaw rate calculated by the standard yaw rate calculating means with the avoidance momentum calculated by the avoidance momentum calculating means; target assist electrical current calculating means that calculates a target assist electrical current, which is supplied to a steering actuator, based on a deviation between the corrected standard yaw rate and an actual yaw rate; under-steer determining means that determines an under-steer state of the vehicle; and reaction force electrical current calculating means that calculates a reaction force electrical current which decreases the target assist electrical current, when the under-steer state of the vehicle is determined by the under-steer determining means and the collision avoidance operation by the driver is determined by the collision avoidance operation determining means.

With the above described construction, when the driver performs the operation of avoiding collision with an obstacle, the avoidance momentum necessary for the own vehicle to avoid the obstacle is calculated; the target assist electrical current supplied to the steering actuator is calculated based on the deviation between the standard yaw rate corrected in accordance with the avoidance momentum and the actual yaw rate; and the target assist electrical current is supplied to the steering actuator, thereby assisting the collision avoidance operation of the driver. When the under-steer state of the vehicle is determined, and the collision avoidance operation by the driver is determined, the target assist electrical current is decreased by the reaction force electrical current. Therefore, the steering angle is prevented from becoming too large by excessive assist, and the return operation after avoiding the obstacle can be facilitated.

According to a second feature of the present invention, there is provided a vehicle operation assisting system that assists a collision avoidance operation which a driver performs to avoid collision with an obstacle during traveling of a vehicle, comprising: collision avoidance operation determining means that determines the collision avoidance operation by the driver; obstacle detecting means that detects an obstacle with which an own vehicle has a chance of colliding; avoidance momentum calculating means that calculates avoidance momentum necessary for avoiding the obstacle detected by the obstacle detecting means when the collision avoidance operation determining means determines the collision avoidance operation by the driver; target assist electrical current calculating means that calculates a target assist electrical current, which is supplied to a steering actuator, based on the avoidance momentum calculated by the avoidance momentum calculating means; under-steer determining means that determines an under-steer state of the vehicle; and reaction force electrical current calculating means that calculates a reaction force electrical current which decreases the target assist electrical current, when the under-steer state of the vehicle is determined by the under-steer determining means and the collision avoidance operation by the driver is determined by the collision avoidance operation determining means.

With the above described construction, when the driver performs the operation of avoiding collision with an obstacle, the avoidance momentum necessary for the own vehicle to avoid the obstacle is calculated; based on the avoidance momentum, the target assist electrical current which is supplied to the steering actuator is calculated; and the target assist electrical current is supplied to the steering actuator, thereby assisting the collision avoidance operation of the driver. When the under-steer state of the vehicle is determined and the collision avoidance operation by the driver is determined, the target assist electrical current is decreased by the reaction force electrical current. Therefore, the steering angle is prevented from becoming too large by the excessive assist, and the return operation after avoiding the obstacle can be facilitated.

In order to achieve the second object, according to a third feature of the present invention, there is provided a vehicle operation assisting system that assists a collision avoidance operation which a driver performs to avoid collision with an obstacle during traveling of a vehicle, comprising: standard yaw rate calculating means that calculates a standard yaw rate of the vehicle; collision avoidance operation determining means that determines the collision avoidance operation by the driver; obstacle detecting means that detects an obstacle with which an own vehicle has a chance of colliding; avoidance momentum calculating means that calculates avoidance momentum necessary for avoiding the obstacle detected by the obstacle detecting means, when the collision avoidance operation determining means determines the collision avoidance operation by the driver; standard yaw rate correcting means that corrects the standard yaw rate calculated by the standard yaw rate calculating means with the avoidance momentum calculated by the avoidance momentum calculating means; target assist electrical current calculating means that calculates a target assist electrical current, which is supplied to a steering actuator, based on a yaw rate deviation that is a deviation between the corrected standard yaw rate and an actual yaw rate; correcting means that reduces the target assist electrical current when an absolute value of the yaw rate deviation is not more than a threshold, and that, when the collision avoidance operation determining means determines the collision avoidance operation by the driver, sets a reduction amount of the target assist electrical current to be smaller than when it does not determine the collision avoidance operation.

With the above described construction, when assisting the steering operation of the driver by supplying the target assist electrical current calculated based on the yaw rate deviation, which is the deviation between the standard yaw rate and the actual yaw rate, to the steering actuator, if the collision avoidance operation by the driver is determined, the avoidance momentum necessary for the own vehicle to avoid the obstacle is calculated, and the target assist electrical current is corrected in accordance with the avoidance momentum. When the absolute value of the yaw rate deviation is not more than the threshold and the vehicle behavior is stable, the correcting means reduces the target assist electrical current, and therefore, a feeling of discomfort of the driver due to excessive assist can be eliminated. In addition, when the collision avoidance operation by the driver is determined, the reduction amount of the target assist electrical current is set to be smaller than when it is not determined, and therefore, avoidance of the obstacle can be reliably performed by making it difficult to reduce the target assist electrical current at an emergent situation where the collision avoidance operation is performed.

According to a fourth feature of the present invention, in addition to the third feature, the standard yaw rate calculating means outputs either smaller one of a steering angle standard yaw rate calculated based on a steering angle, or an acceleration standard yaw rate calculated based on lateral acceleration.

With the above described construction, while the driving intention of the driver is reflected by the steering angle standard yaw rate on the normal road surface, when the steering angle standard yaw rate is calculated to be too large on the road surface having a low friction coefficient, over-steer and under-steer can be suppressed early and reliably by conducting a control in accordance with the road surface friction coefficient by the lateral acceleration standard yaw rate. Since the detected lateral acceleration is small in the area of a low vehicle speed, the detection error becomes large, and thus the error of the lateral acceleration standard yaw rate calculated based on the lateral acceleration also becomes large. However, since the lateral acceleration standard yaw rate is calculated to be larger than the actual value at a low vehicle speed, the low-accuracy control based on the low-accuracy lateral acceleration standard yaw rate can be prevented from being conducted.

In order to achieve the third object, according to a fifth feature of the present invention, there is provided a vehicle operation assisting system that assists a collision avoidance operation which a driver performs to avoid collision with an obstacle during traveling of a vehicle, comprising: standard yaw rate calculating means that calculates a standard yaw rate of the vehicle; collision avoidance operation determining means that determines the collision avoidance operation by the driver; obstacle detecting means that detects an obstacle with which an own vehicle has a chance of colliding; avoidance momentum calculating means that calculates avoidance momentum necessary for avoiding the obstacle detected by the obstacle detecting means, when the collision avoidance operation determining means determines the collision avoidance operation by the driver; standard yaw rate correcting means that corrects the standard yaw rate calculated by the standard yaw rate calculating means with the avoidance momentum calculated by the avoidance momentum calculating means; target assist electrical current calculating means that calculates a target assist electrical current, which is supplied to a steering actuator, based on a deviation between the corrected standard yaw rate and an actual yaw rate; and target assist electrical current restricting means that restricts an upper limit value of the target assist electrical current which is calculated by the target assist electrical current calculating means in accordance with steering torque inputted into a steering wheel by the driver, when the collision avoidance operation determining means determines the collision avoidance operation by the driver.

With the above described construction, when the driver performs the operation of avoiding the collision with the obstacle, the avoidance momentum necessary for the own vehicle to avoid the obstacle is calculated; the target assist electrical current, which is supplied to the steering actuator is calculated based on the deviation between the standard yaw rate corrected in accordance with the avoidance momentum and the actual yaw rate; and the target assist electrical current is supplied to the steering actuator, thereby assisting the collision avoidance operation of the driver. When the collision avoidance operation by the driver is determined, the upper limit value of the target assist electrical current is restricted in accordance with the steering torque inputted into the steering wheel by the driver. Therefore, the steering-wheel turning becomes excessively smooth due to excessive assist, a feeling of discomfort of the driver due to the deteriorated steering feeling is eliminated, and disturbance of the vehicle behavior due to excessive assist can be prevented.

According to a sixth feature of the present invention, there is provided vehicle operation assisting system that assists a collision avoidance operation which a driver performs to avoid collision with an obstacle during traveling of a vehicle, comprising: collision avoidance operation determining means that determines the collision avoidance operation by the driver; obstacle detecting means that detects an obstacle with which an own vehicle has a chance of colliding; avoidance momentum calculating means that calculates avoidance momentum necessary for avoiding the obstacle detected by the obstacle detecting means, when the collision avoidance operation determining means determines the collision avoidance operation by the driver; target assist electrical current calculating means that calculates a target assist electrical current, which is supplied to a steering actuator, based on the avoidance momentum calculated by the avoidance momentum calculating means; and target assist electrical current restricting means that restricts an upper limit value of the target assist electrical current which is calculated by the target assist electrical current calculating means in accordance with steering torque inputted into a steering wheel by the driver, when the collision avoidance operation determining means determines the collision avoidance operation by the driver.

With the above described construction, when the driver performs the operation of avoiding collision with an obstacle, the avoidance momentum necessary for the own vehicle to avoid the obstacle is calculated; the target assist electrical current which is supplied to the steering actuator is calculated based on the avoidance momentum; and the target assist electrical current is supplied to the steering actuator, thereby assisting the collision avoidance operation of the driver is assisted. When the collision avoidance operation by the driver is determined, the upper limit value of the target assist electrical current is restricted in accordance with the steering torque inputted into the steering wheel by the driver. Therefore, the steering-wheel turning can be prevented from becoming too smooth due to excessive assist, a feeling of discomfort of the driver due to the deteriorated steering feeling is eliminated, and disturbance of the vehicle behavior due to excessive assist can be prevented.

According to a seventh feature of the present invention, in addition to the five or sixth feature, when a direction of the steering torque inputted into the steering wheel by the driver is the same as a direction of the target assist electrical current, the target assist electrical current restricting means sets the upper limit value of the target assist electrical current to be low as compared with when they are in opposite directions.

With the above described construction, when the direction of the steering torque inputted into the steering wheel by the driver is the same direction as the direction of the target assist electrical current, the upper limit value of the target assist electrical current becomes low. Therefore, the steering-wheel turning can be prevented from becoming too smooth due to excessive target assist electrical current, and excessive turn of the steering wheel can be prevented. Since the upper limit value of the target assist electrical current becomes high when the direction of the steering torque inputted into the steering wheel by the driver is the direction opposite from the direction of the target assist electrical current, it is prevented that the target assist electrical current in the opposite direction is too small to inhibit turning of the steering wheel, and excessive turn of the steering wheel can be prevented.

A correction coefficient calculating means M18 of a second embodiment corresponds to the correcting means of the present invention.

The above-mentioned object, other objects, characteristics, and advantages of the present invention will become apparent from preferred embodiments, which will be described in detail below by reference to the attached drawings.

BRIEF DESCRIPTION OF THE DRAWINGS

FIG. 1 is a view showing a general construction of an automobile loaded with an operation assisting system.

FIG. 2 is a view showing a construction of a steering device.

FIG. 3 is a block diagram of a control system of the operation assisting system.

FIG. 4 is an explanatory view of a target lateral moving distance.

FIG. 5 is a diagram explaining a method of determining over-steer, under-steer, counter-steer and neutral steer.

FIG. 6 is a diagram showing a map for searching for a reaction force electrical current from a yaw rate deviation.

FIG. 8 is a block diagram of a control system of an operation assisting system.

FIG. 9 is a diagram showing a map for searching for a correction coefficient K from a yaw rate deviation $\Delta\gamma$.

FIG. 10 is a block diagram showing a construction of standard yaw rate calculating means.

FIG. 11 is a graph showing a lower limit value of lateral acceleration with respect to a vehicle speed.

FIG. 12 is a graph showing an operation of low select means.

FIG. 13 is a block diagram of a control system of an operation assisting system.

FIG. 14 is a graph showing relationship between steering torque and a maximum value of a correction electrical current.

DESCRIPTION OF THE PREFERRED EMBODIMENTS

Hereinafter, a first embodiment of the present invention will be described based on FIGS. 1 to 6.

Figure 1:
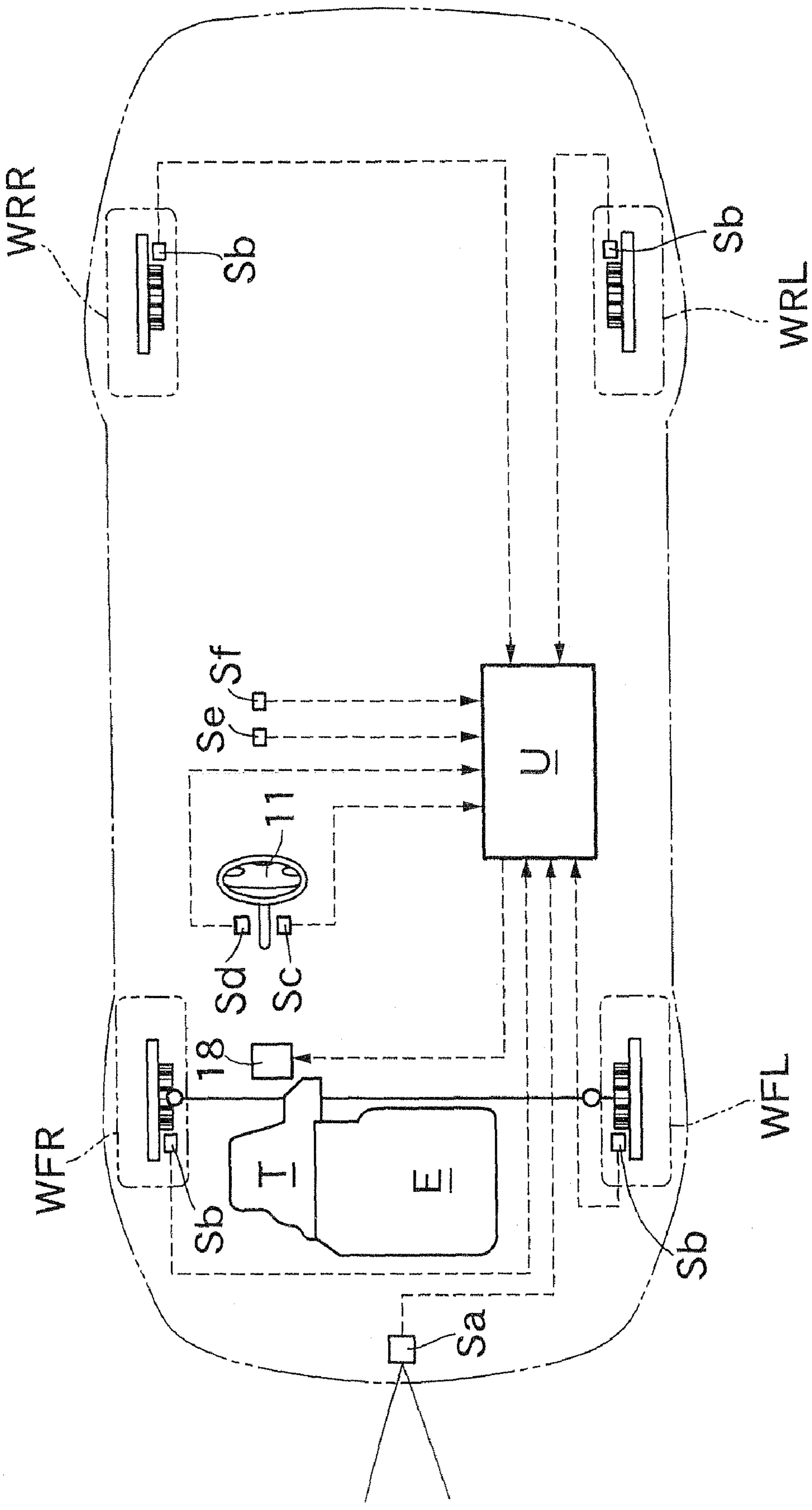
FIGS. 1 to 6 show a first embodiment of the present invention.
Figure 2:
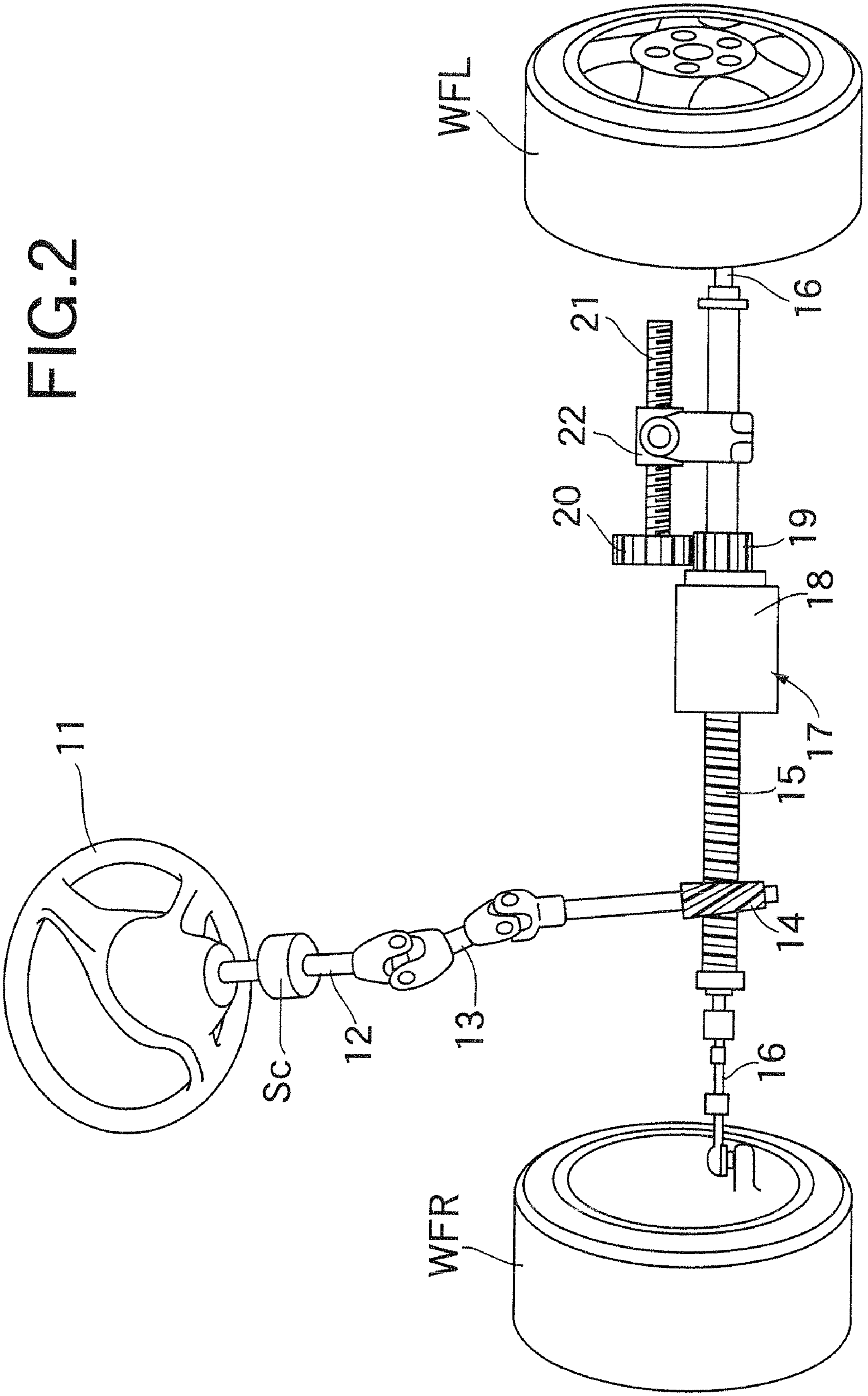

As shown in FIGS. 1 and 2, a four-wheel vehicle loaded with an operation assisting system of this embodiment includes left and right front wheels WFL and WFR that are driven wheels to which a driving force of an engine E is transmitted via a transmission T, and left and right rear wheels WRL and WRR that are follow wheels which rotate with traveling of the vehicle.

Rotation of a steering wheel 11 is transmitted to a rack 15 via a steering shaft 12, a connecting shaft 13 and a pinion 14, and reciprocal movement of the rack 15 is further transmitted to the left and right front wheels WFL and WFR via left and right tie rods 16 and 16. A power steering device 17 provided at the steering system includes a driven gear 19 provided at an output shaft of a steering actuator 18, a follow gear 20 meshed with the driven gear 19, a screw shaft 21 integrated with the follow gear 20, and a nut 22 meshed with the screw shaft 21 and connected to the rack 15. Therefore, when the steering actuator 18 is driven, the driving force can be transmitted to the left and right front wheels WFL and WFR via the driven gear 19, the follow gear 20, the screw shaft 21, the nut 22, the rack 15, and the left and right tie rods 16 and 16.

Connected to an electronic control unit U are a radar device Sa that transmits an electromagnetic wave such as a millimeter wave toward an area ahead of a vehicle body, and that detects a relative distance between an obstacle and an own vehicle, relative speed between the obstacle and the own vehicle, an offset distance between the obstacle and the own vehicle, and lateral width of the obstacle based on the reflection wave; wheel speed sensors Sb that detect rotational frequencies of the front wheels WFL and WFR and the rear wheels WRL and WRR; a steering angle sensor Sc that detects a steering angle δ of the steering wheel 11; a steering torque sensor Sd that detects steering torque T which is inputted into the steering wheel 11; a yaw rate sensor Se that detects an actual yaw rate γ of the vehicle; and a lateral acceleration sensor Sf that detects lateral acceleration G of the vehicle.

In place of the radar device Sa comprising the millimeter wave radar, a laser radar can be used.

The electronic control unit U controls the operation of the steering actuator 18 based on a signal from the radar device Sa, and signals from the wheel speed sensors Sb, the steering angle sensor Sc, the yaw rate sensor Se and the lateral acceleration sensor Sf.

Figure 3:
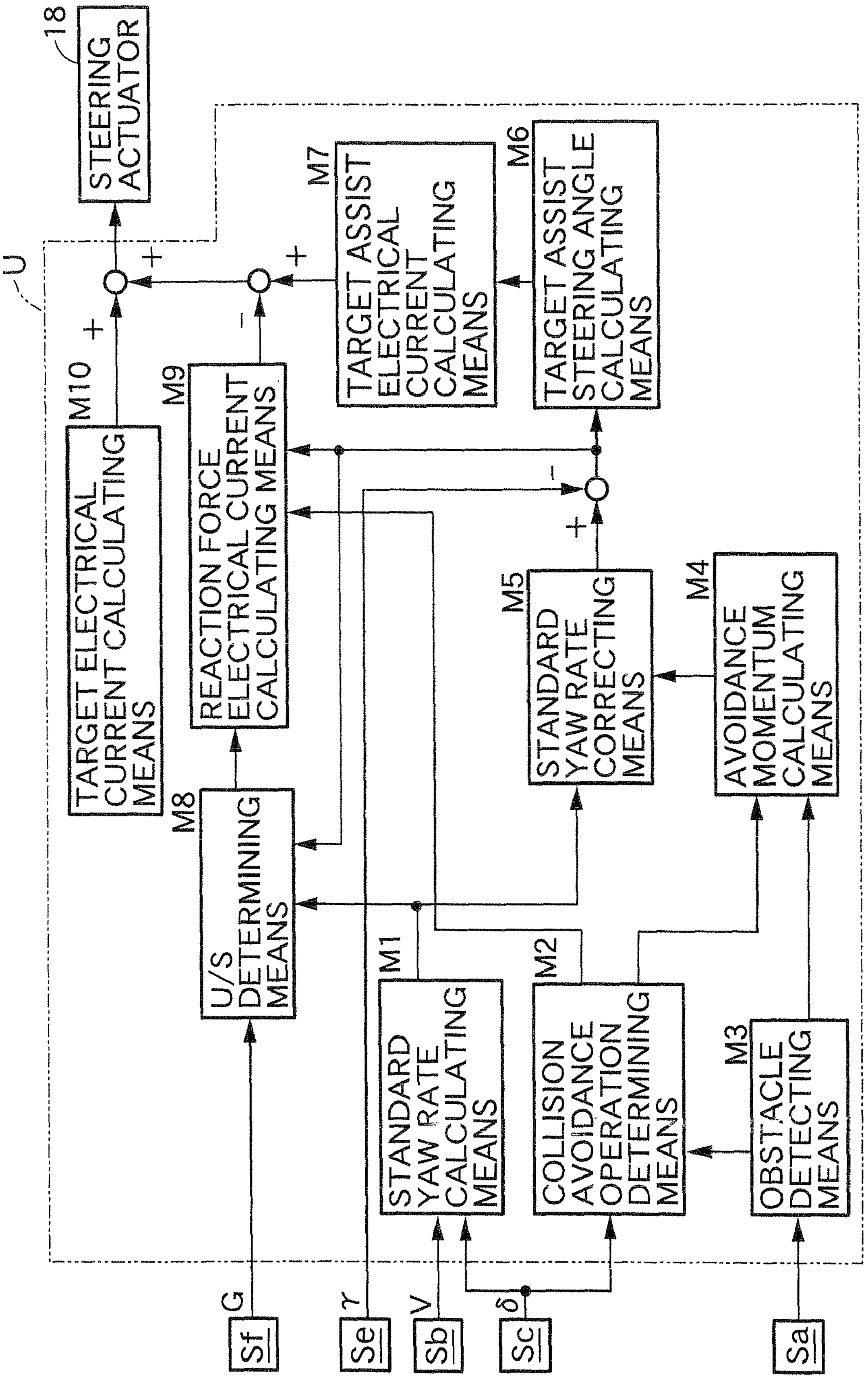

As shown in FIG. 3, the electronic control unit U includes standard yaw rate calculating means M1, collision avoidance operation determining means M2, obstacle detecting means M3, avoidance momentum calculating means M4, standard yaw rate correcting means M5, target assist steering angle calculating means M6, target assist electrical current calculating means M7, under-steer determining means M8, reaction force electrical current calculating means M9, and target electrical current calculating means M10.

Next, an operation in normal situation in which a driver does not perform an operation of avoiding an obstacle will be described.

The standard yaw rate calculating means M1 calculates a standard yaw rate γt based on the steering angle δ detected in the steering angle sensor Sc and a vehicle speed V calculated from the output from the wheel speed sensors Sb. Target assist steering angle calculating means M6 calculates a target assist steering angle based on a deviation (yaw rate deviation Δγ) between the actual yaw rate γ detected in the yaw rate sensor Se and the standard yaw rate γt. The target assist steering angle corresponds to a steering angle which the power steering device 17 adds to the steering angle δ at which the driver actually operates the steering wheel 11 to eliminate the over-steer state and the under-steer state of the vehicle. The target assist electrical current calculating means M7 converts the target assist steering angle which is calculated in the target assist steering angle calculating means M6 into a target assist electrical current which is supplied to the steering actuator 18.

The target electrical current calculating means M10 calculates a target electrical current which is supplied to the steering actuator 18 based on, for example, the steering torque detected by the steering torque sensor and the vehicle speed V of the own vehicle calculated from the output of the wheel speed sensors Sb. Then, the steering actuator 18 is driven, based on the electrical current value which is obtained by adding the target assist electrical current converted in the target assist electrical current calculating means M7 to the target electrical current calculated in the target electrical current calculating means M10. Therefore, the steering operation of the driver can be assisted by smoothening or lightening the turning of the steering wheel 11 in the steering returning direction when the vehicle tends to be in the over-steer state, and by suppressing ease of turning the steering wheel 11 when the vehicle tends to be in the under-steer state.

Next, an operation during avoidance situation in which the driver performs an avoidance operation of an obstacle will be described.

The collision avoidance operation determining means M2 determines whether the driver performs an operation to avoid an obstacle O or not, based on the steering angle δ of the steering wheel 11 detected by the steering angle sensor Sc. Specifically, when a steering angle speed dδ/dt obtained by differentiating the steering angle δ with respect to time is a predetermined value (for example, 0.85 rad/sec) or more, or the steering angle δ which the steering angle sensor Sc outputs is a predetermined value (for example, 0.3 rad) or more, it is determined that the driver has performed an operation to avoid the obstacle.

Figure 4:
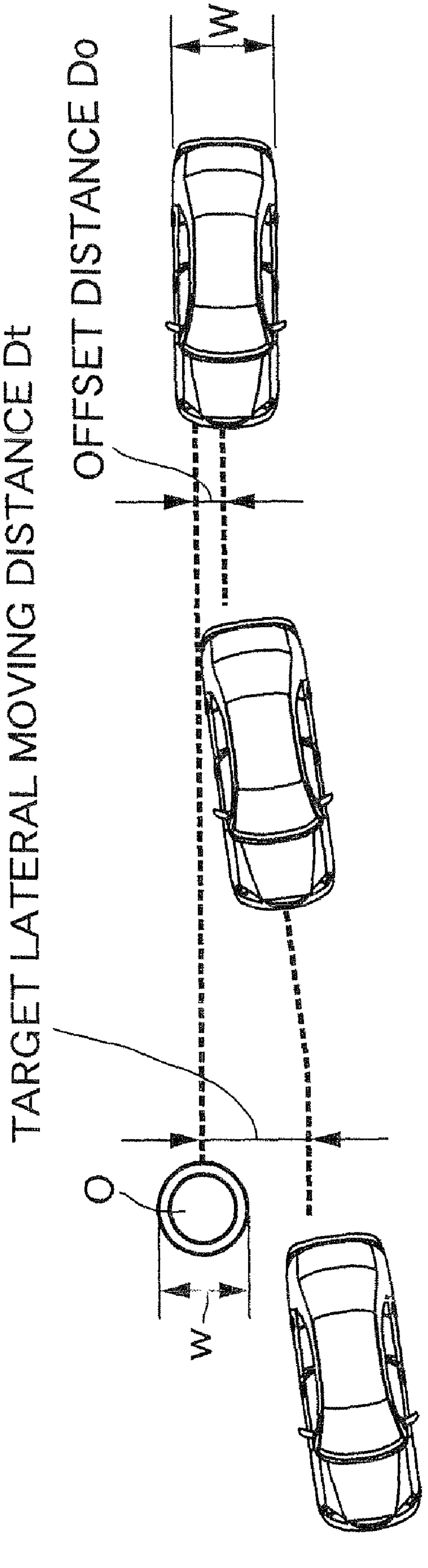

As shown in FIG. 4, the radar device Sa detects the lateral width w of the obstacle O, and a deviation of the center of the obstacle O with respect to the center line of the own vehicle, namely, an offset distance Do, in addition to the relative speed and the relative distance between the obstacle O and the own vehicle.

The obstacle detecting means M3 determines the obstacle O on an expected route of the own vehicle based on the detection result by the radar device Sa. When the collision avoidance operation determining means M2 determines the avoidance operation by the driver, the avoidance momentum calculating means M4 calculates the avoidance momentum (target lateral moving distance) Dt necessary for the own vehicle to avoid the obstacle O, based on the lateral width w of the obstacle O, the known lateral width W of the own vehicle, and a predetermined margin α, as follows:

$$Dt=(w/2)+(W/2)+\alpha-Do.$$

It is when the center of the obstacle O lies on the center line of the own vehicle, namely, when the obstacle O is right in front of the own vehicle that there is the most difficult in avoiding collision between the own vehicle and the obstacle O. Also, in such a case, if the own vehicle moves in the lateral direction by the target lateral moving distance in, the own vehicle can pass through along a side of the obstacle O with an allowance corresponding to the margin α left.

The standard yaw rate correcting means M5 corrects the standard yaw rate γt calculated in the standard yaw rate calculating means M1 in accordance with the avoidance momentum Dt calculated in the avoidance momentum calculating means M4. As a result, the standard yaw rate γt calculated from the steering angle δ and the vehicle speed V is corrected to be larger as it becomes more difficult for the own vehicle to avoid the obstacle O. Therefore, when the driver performs a steering operation for avoiding collision with the obstacle O, the steering operation is assisted with the power steering device 17, thereby effectively performing the collision avoidance.

The under-steer determining means M8 determines that the vehicle is in the under-steer state based on the standard yaw rate γt calculated in the standard yaw rate calculating means M1, the yaw rate deviation Δγ, and the lateral acceleration G detected by the lateral acceleration sensor Sf.

Figure 5:
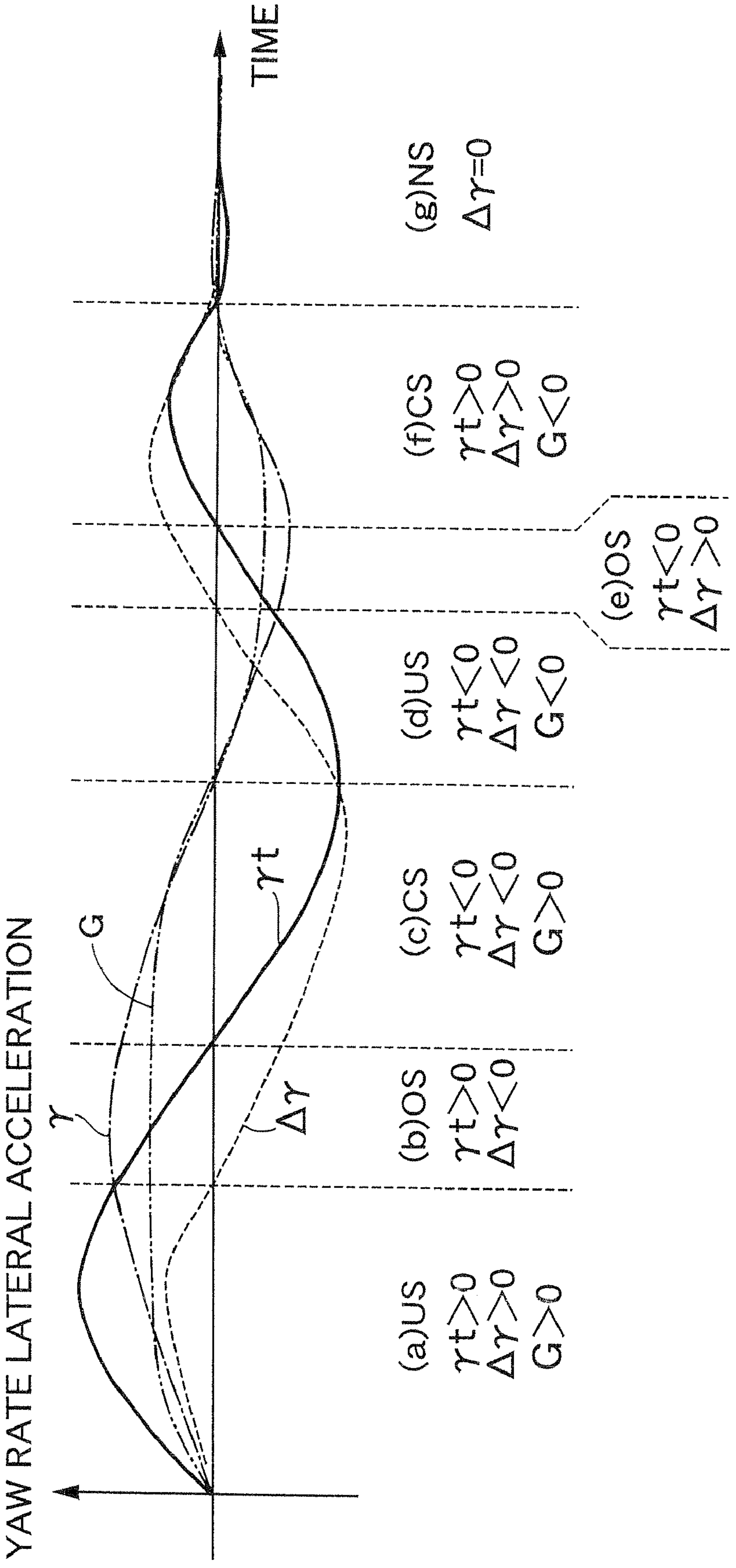

FIG. 5 shows the changes of the yaw rate γ (see the chain line), the standard yaw rate γt (see the solid line), the yaw rate deviation Δγ (see the broken line) and the lateral acceleration G (see the two-dot chain line), when the vehicle performs lane change. In accordance with the signs of the standard yaw rate γt, the yaw rate deviation Δγ and the lateral acceleration G, it is determined whether the vehicle is in over-steer, under-steer, counter-steer or neutral steer.

Namely, the vehicle is in over-steer in the region (b) and the region (e) in which the yaw rate deviation Δγ and the standard yaw rate γt are in reverse signs, and the vehicle is in neutral-steer in the region (g) in which the yaw rate deviation Δγ is substantially 0. The vehicle is in under-steer in the region (a) and the region (d) in which the yaw rate deviation Δγ and the standard yaw rate γt are in the same signs, and the lateral acceleration G is also in the same sign. The vehicle is in counter-steer in the region (c) and the region (f) in which the yaw rate deviation Δγ and the standard yaw rate γt are in the same signs, and the lateral acceleration G is in the reverse sign.

Figure 6:
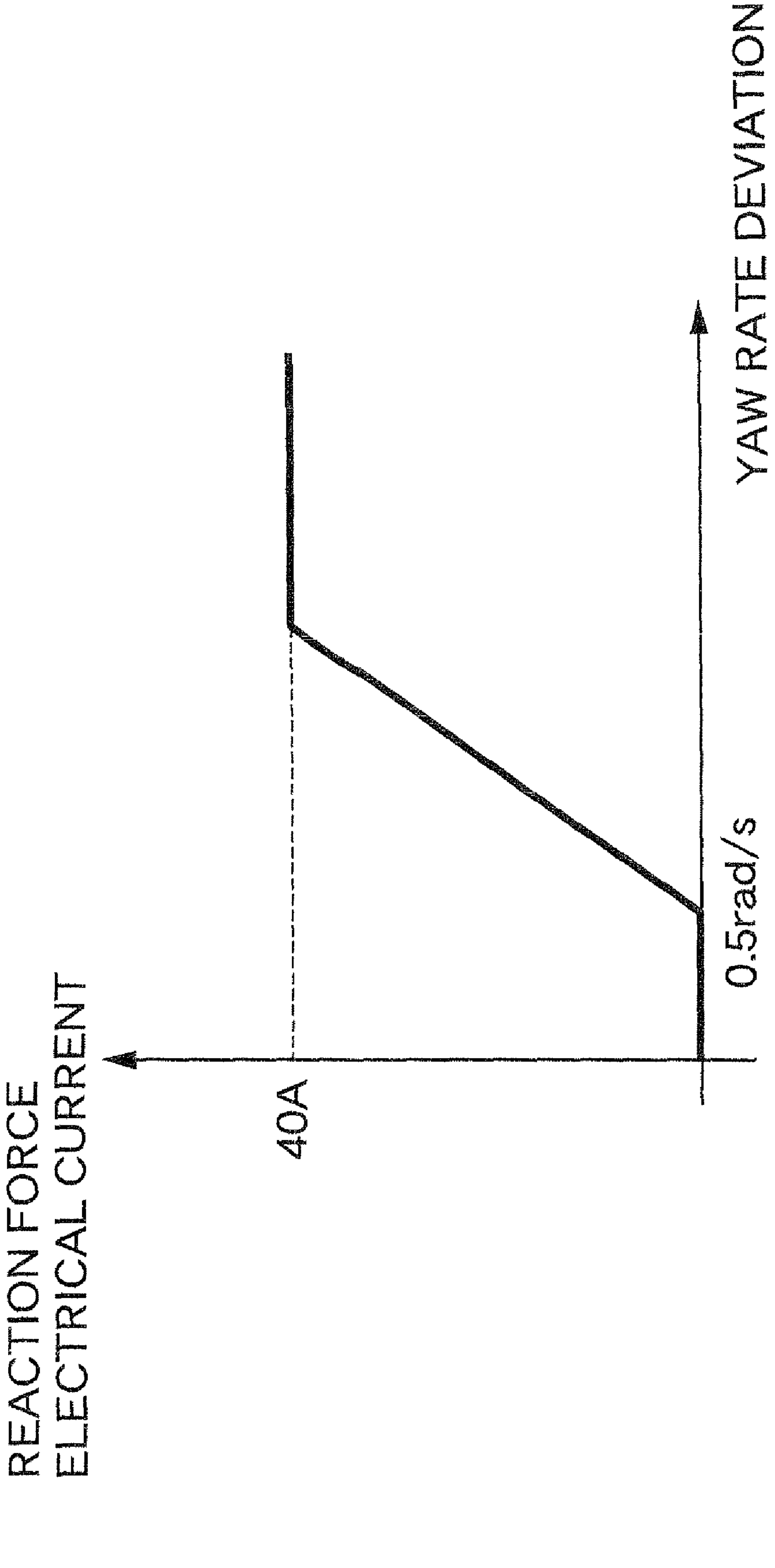

When the under-steer determining means M8 determines the under-steer state and the collision avoidance operation determining means M2 determines the collision avoidance operation of the driver, the reaction force electrical current calculating means M9 calculates the reaction force electrical current based on the yaw rate deviation Δγ. As shown in FIG. 6, the reaction force electrical current starts to rise at a predetermined rate at the moment when the yaw rate deviation Δγ exceeds a predetermined value (for example, 0.5 rad/sec), and is kept constant at a predetermined electrical current value (for example, 40A). The reaction force electrical current calculated in this manner is subtracted from the target assist electrical current calculated in the target assist electrical current calculating means M7.

The steering actuator 18 is driven based on the electrical current value which is obtained by adding the target assist electrical current corrected with the reaction force electrical current to the target electrical current calculated in the target electrical current calculating means M10. At this time, since the drive electrical current of the steering actuator 18 becomes smaller by the amount of the reaction force electrical current, the steering reaction force against the steering operation of the driver increases.

When the vehicle is in the under-steer state, the driver tends to increase the turn of the steering wheel 11 to cause the yaw rate γ of his or her intention, and the steering operation of the driver is assisted at this time by the target assist electrical current which increases with an increase in the yaw rate deviation Δγ. Especially in the case where the driver performs a large and abrupt steering operation to avoid collision with the obstacle O when the vehicle is in the under-steer state, if the steering operation of the driver is assisted by the increased target assist electrical current, there is a possibility that the steering angle becomes so large that the return operation after avoidance of collision becomes difficult.

However, according to this embodiment, if the collision avoidance operation of the driver is determined when the vehicle is in the under-steer state, the target assist electrical current decreases by the amount of the reaction force electrical current calculated by the reaction force electrical current calculating means M9. Therefore, the steering reaction force of the steering wheel 11 increases to suppress increase in the turn of the steering wheel more than in the usual time, thereby avoiding a situation where the excessive steering angle occurs and the return operation becomes difficult.

Next, a second embodiment of the present invention will be described based on FIG. 7.

In the aforementioned first embodiment, as shown in FIG. 3, when the collision avoidance operation determining means M2 determines the avoidance operation by the driver, the avoidance momentum calculating means M4 calculates the avoidance momentum Dt necessary for avoiding the obstacle O which is detected in the obstacle detecting means M3, and the standard yaw rate correcting means M5 corrects the standard yaw rate γt calculated in the standard yaw rate calculating means M1 in accordance with the avoidance momentum Dt. Then, the target assist steering angle calculating means M6 calculates the target assist steering angle based on the deviation between the actual yaw rate γ and the standard yaw rate γt, and the target assist electrical current calculating means M7 converts the target assist steering angle into the target assist electrical current which is supplied to the steering actuator 18.

Figure 7:
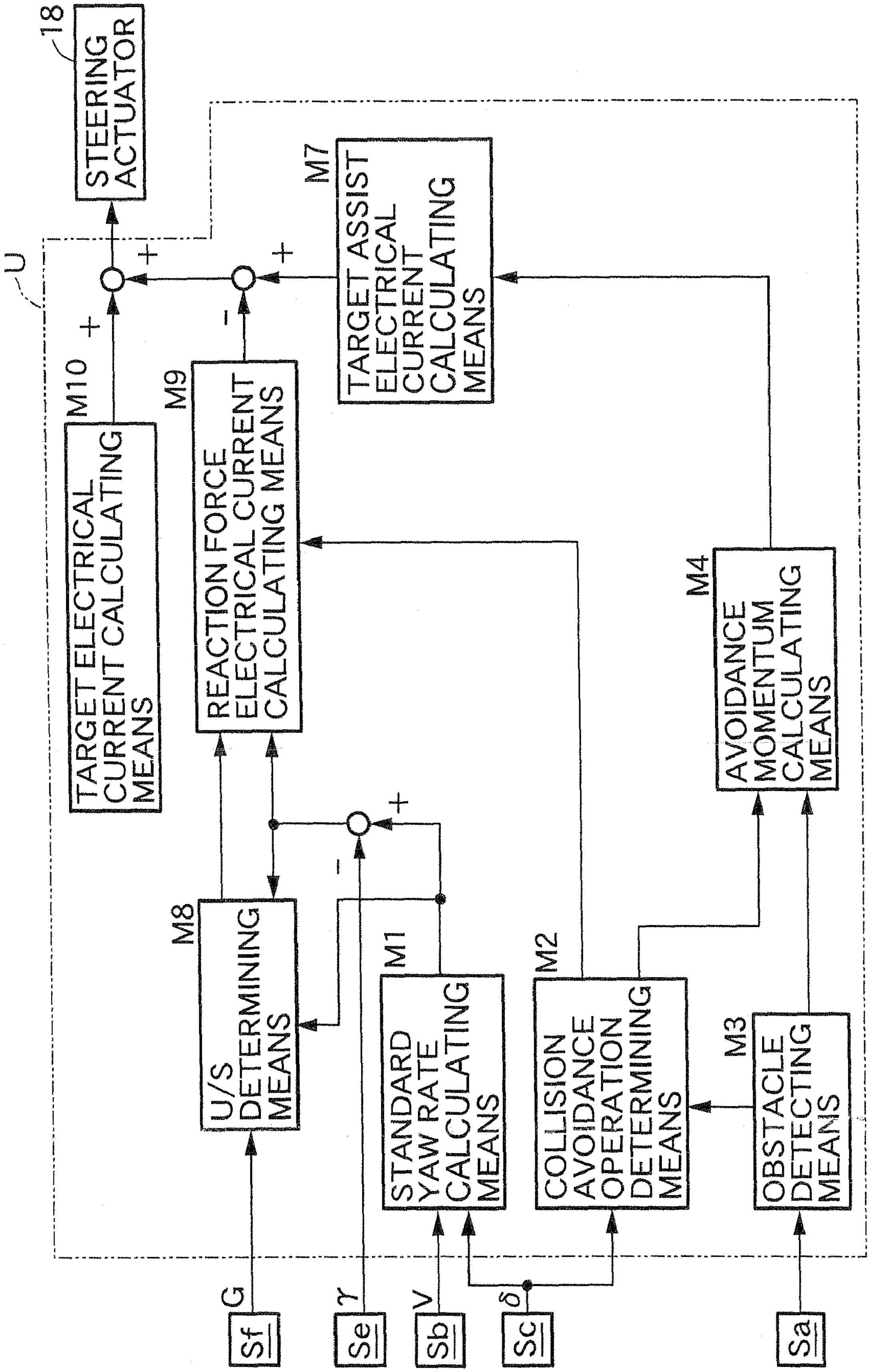
FIG. 7 is a block diagram of a control system of an operation assisting system according to a second embodiment.

On the other hand, the second embodiment does not include the standard yaw rate correcting means M5 and the target assist steering angle calculating means M6 of the first embodiment as shown in FIG. 7, and the target assist electrical current calculating means M7 directly calculates the target assist electrical current based on the avoidance momentum Dt calculated by the avoidance momentum calculating means M4.

While in the first embodiment, the yaw rate deviation Δγ inputted into the under-steer determining means M8 and the reaction force electrical current calculating means M9 is the deviation between the standard yaw rate γt corrected in the standard yaw rate correcting means M5 and the actual yaw rate γ, the second embodiment does not have the standard yaw rate correcting means M5, and therefore, the deviation between the uncorrected, standard yaw rate γt and the actual yaw rate γ is inputted into the under-steer determining means M8 and the reaction force electrical current calculating means M9.

The second embodiment is the same as the first embodiment in the respect that if the collision avoidance operation of the driver is determined when the vehicle is in the under-steer state, the target assist electrical current is decreased by the amount of the reaction force electrical current calculated by the reaction force electrical current calculating means M9.

Thus, according to the second embodiment, the structure of the control system can be simplified by eliminating the standard yaw rate correcting means M5 and the target assist steering angle calculating means M6, while achieving the same operational effect as in the first embodiment.

Next, a third embodiment of the present invention will be described based on FIGS. 8 and 9.

Figure 8:
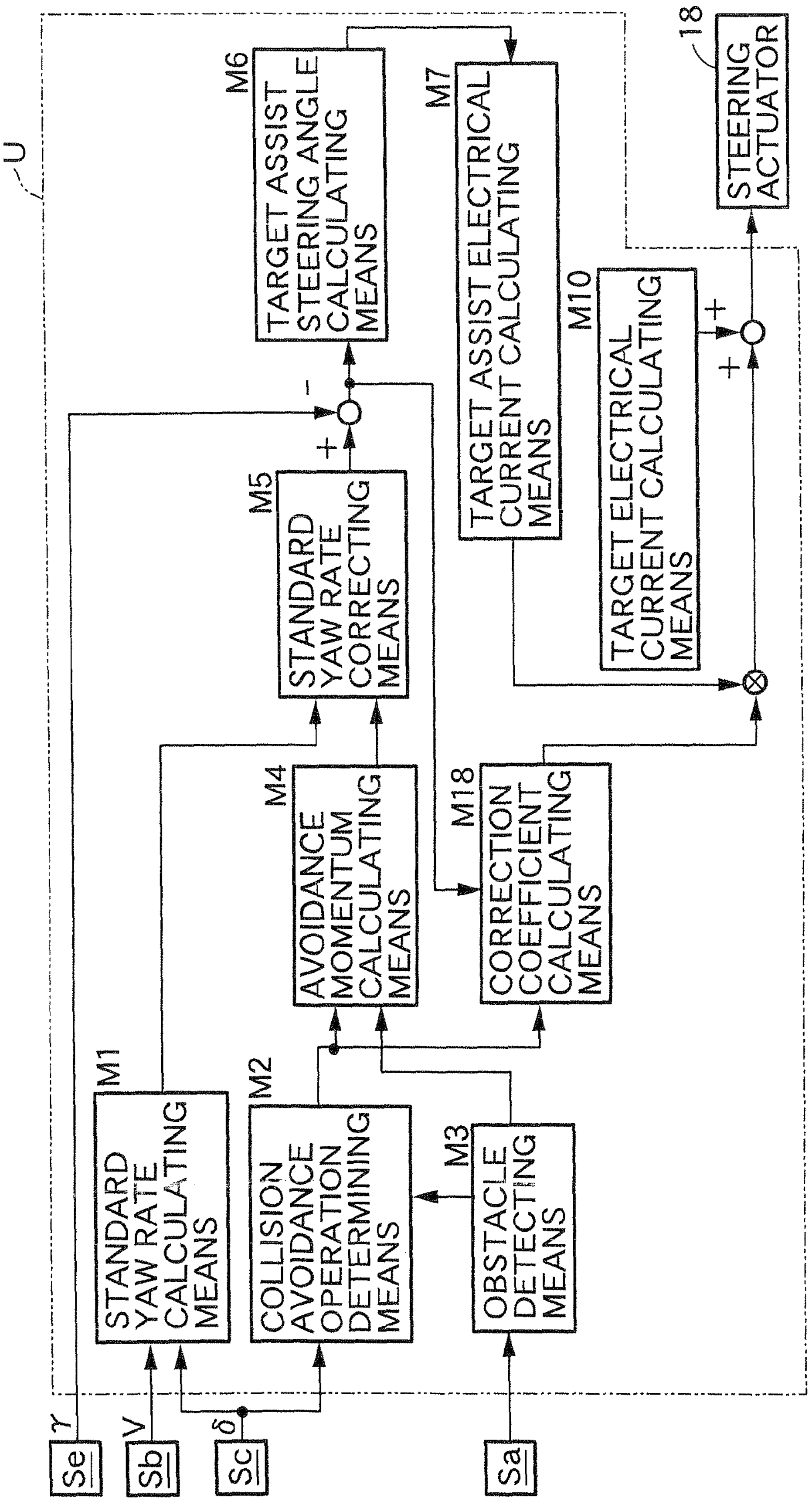
FIGS. 8 and 9 show a third embodiment of the present invention.

As shown in FIG. 8, the electronic control unit U includes the standard yaw rate calculating means M1, the collision avoidance operation determining means M2, the obstacle detecting means M3, the avoidance momentum calculating means M4, the standard yaw rate correcting means M5, the target assist steering angle calculating means M6, the target assist electrical current calculating means M7, correction coefficient calculating means M18, and the target electrical current calculating means M10.

Next, an operation in normal situation in which a driver does not perform an operation of avoiding an obstacle will be described.

The standard yaw rate calculating means M1 calculates the standard yaw rate γt, based on the steering angle δ detected in the steering angle sensor Sc and a vehicle V of the own vehicle calculated from the output from the wheel speed sensors Sb. The target assist steering angle calculating means M6 calculates the target assist steering angle, based on a deviation between the actual yaw rate γ detected in the yaw rate, sensor Se and the standard yaw rate γt. The vehicle is in the over-steer state when the actual yaw rate γ is larger than the standard yaw rate γt, and the vehicle is in the under-steer state when the actual yaw rate γ is smaller than the standard yaw rate γt. The target assist steering angle corresponds to the steering angle which the power steering device 17 adds to the steering angle δ at which the driver actually operates the steering wheel 11 to eliminate these over-steer state and under-steer state. The target assist electrical current calculating means M7 converts the target assist steering angle which is calculated in the target assist steering angle calculating means M6 into the target assist electrical current which is supplied to the steering actuator 18.

The correction coefficient calculating means M18 calculates different coefficients K, when the later-described collision avoidance operation determining means M2 does not determine the collision avoidance operation of the driver (during normal situation) and when it determines the collision avoidance operation of the driver (during avoidance situation). For both the normal situation and avoidance situation, the correction coefficient K becomes a variable with the deviation (yaw rate deviation Δγ) between the actual yaw rate γ and the standard yaw rate γt as the parameter. The target assist electrical current calculated in the target assist electrical current calculating means M7 is corrected by multiplying it by the correction coefficient K.

The target electrical current calculating means M10 calculates the target electrical current which is supplied to the steering actuator 18, based on, for example, the steering torque detected by the steering torque sensor and the vehicle speed V of the own vehicle calculated from the output of the wheel speed sensors Sb. Then, the steering actuator 18 is driven based on the electrical current value which is obtained by adding the target assist electrical current converted in the target assist electrical current calculating means M7 to the target electrical current calculated in the target electrical current calculating means M10. Therefore, the steering operation of the driver can be assisted by smoothening or lightening the turning of the steering wheel 11 in the steering returning direction when the vehicle tends to be in the over-steer state, and by making the steering wheel 11 heavy in the turning direction when the vehicle tends to be in the under-steer state.

Next, an operation during avoidance situation in which the driver performs an operation of avoiding an obstacle will be described.

The basic functions of the standard yaw rate calculating means M1, the collision avoidance operation determining means M2, the obstacle detecting means M3, the avoidance momentum calculating means M4 and the standard yaw rate correcting means M5 during avoidance situation are the same as in the first embodiment.

However, in the third embodiment, the Correction coefficient calculating means M18 calculates the correction coefficient K different from during normal situation, and corrects the target assist electrical current with the correction coefficient K.

Figure 9:
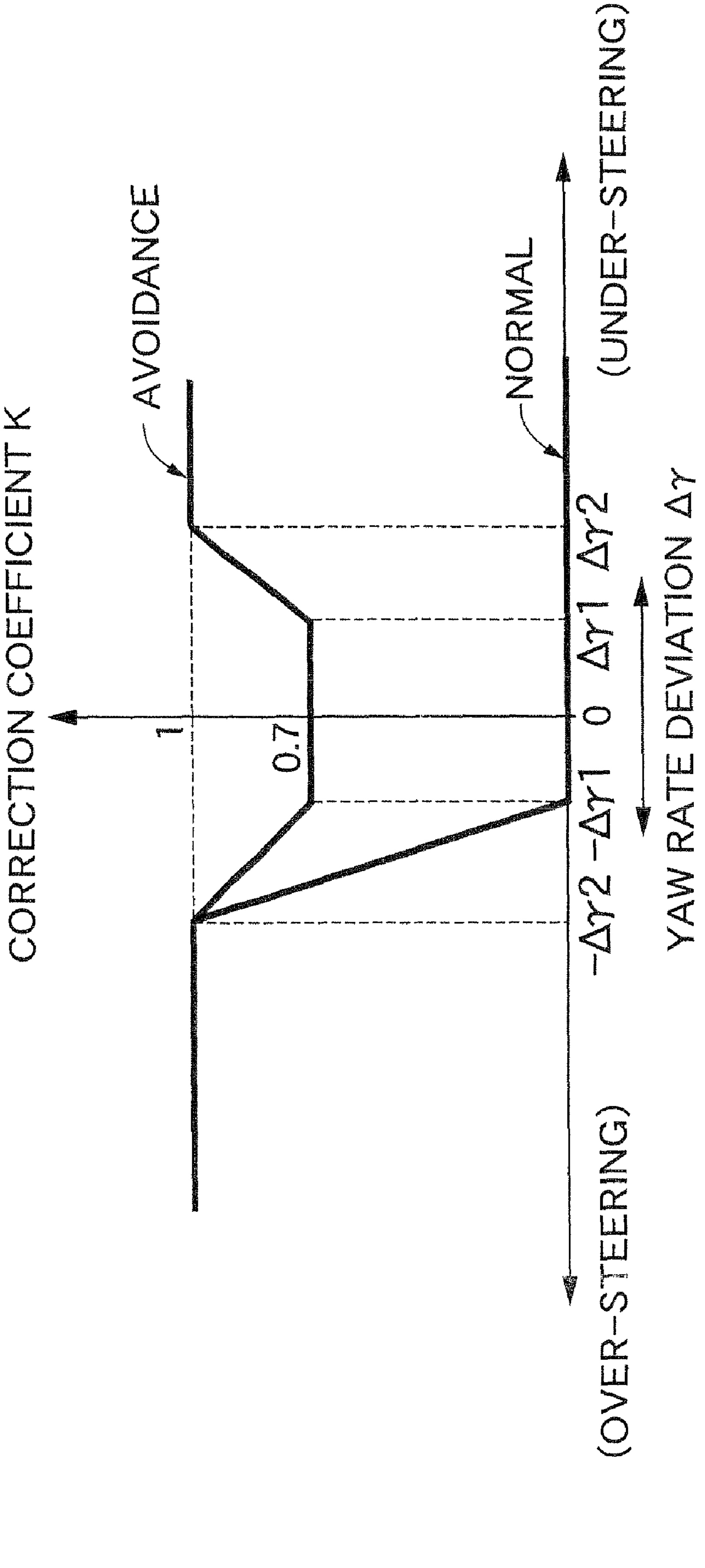

FIG. 9 shows a change in the correction coefficient K with the yaw rate deviation Δγ (=the standard yaw rate γt−the actual yaw rate γ) as the parameter with respect to both the normal situation and avoidance situation. The region on the right side of the origin point where the yaw rate deviation Δγ is positive corresponds to the under-steer region where the standard yaw rate γt is larger than the actual yaw rate γ, and the region on the left side of the origin point where the yaw rate deviation Δγ is negative corresponds to the over-steer region where the standard yaw rate γt is smaller than the actual yaw rate γ.

During normal situation, when the yaw rate deviation Δγ is less than a threshold −Δγ2, the correction coefficient K is kept at 1, but when the yaw rate deviation Δγ is not less than the threshold −Δγ2 and less than a threshold −Δγ1, the correction coefficient K decreases from 1 to 0, and when the yaw rate deviation Δγ is not less than the threshold −Δγ1, the correction coefficient K is kept at 0. In this manner, the target assist electrical current which is supplied to the steering actuator 18 is corrected in the decreasing direction by making the correction coefficient K less than 1 when the absolute value of the yaw rate deviation Δγ is not more than the threshold Δγ2, and therefore, when the vehicle behavior is stable with small tendency to the under-steer and, to the over-steer, the target assist electrical current which is supplied to the steering actuator 18 is reduced, thereby preventing excessive assist which gives the feeling of discomfort to the driver.

The following is the reason that the correction coefficient K is kept at 0 in the under-steer region where the yaw rate deviation Δγ exceeds the threshold Δγ1. Namely, if the steering actuator 18 is caused to generate assist torque when the yaw rate deviation Δγ is large and the under-steer tendency is strong, namely, when the vehicle approaches the turning limit, the vehicle exceeds the turning limit to cause the tires to skid, leading to a possibility of disturbing the vehicle behavior. Therefore, in this case, the correction coefficient K is kept at 0 to control so that the steering actuator 18 does not generate assist torque, thereby avoiding disturbance of the vehicle behavior.

Meanwhile, in avoidance situation, when the absolute value of the yaw rate deviation Δγ exceeds the threshold Δγ2, the correction coefficient K is kept at 1, but when the absolute value of the yaw rate deviation Δγ is not more than the threshold Δγ2 and exceeds the threshold Δγ1, the correction coefficient K decreases from 1 to a predetermined value (0.7), and when the absolute value of the yaw rate deviation Δγ is not more than the threshold. Δγ1, the correction coefficient K is kept at the predetermined value (0.7). In this avoidance situation, when the absolute value of the yaw rate deviation Δγ is not more than the threshold Δγ2 and the vehicle behavior is stable, the target assist electrical current which is supplied to the steering actuator 18 is corrected in the decreasing direction by making the correction coefficient K less than 1, and therefore, it can be prevented that the driver feels discomfort due to excessive assist, while easiness of avoidance steering is kept.

When the absolute value of the yaw rate deviation Δγ is not more than the threshold Δγ1, the correction coefficient K is only reduced from 1 to the predetermined value (0.7) during avoidance situation, while the correction coefficient. K reduces from 1 to 0 during normal situation. Namely, during avoidance situation, control is conducted so that the reduction amount of the assist torque generated by the steering actuator 18 becomes small as compared with during normal situation. This is because at an emergent situation where collision with the obstacle O needs to be avoided, the steering wheel 1 is made easy to turn by generating sufficient assist torque.

Next, a fourth embodiment of the present invention will be described based on FIGS. 10 to 12.

In the third embodiment, the standard yaw rate calculating means M1 calculates the standard yaw rate γt from the steering angle δ and the vehicle speed V, but a fourth embodiment differs from the third embodiment in the respect that the standard yaw rate γt is calculated based on the steering angle δ, the lateral acceleration G and the vehicle speed V.

Figure 10:
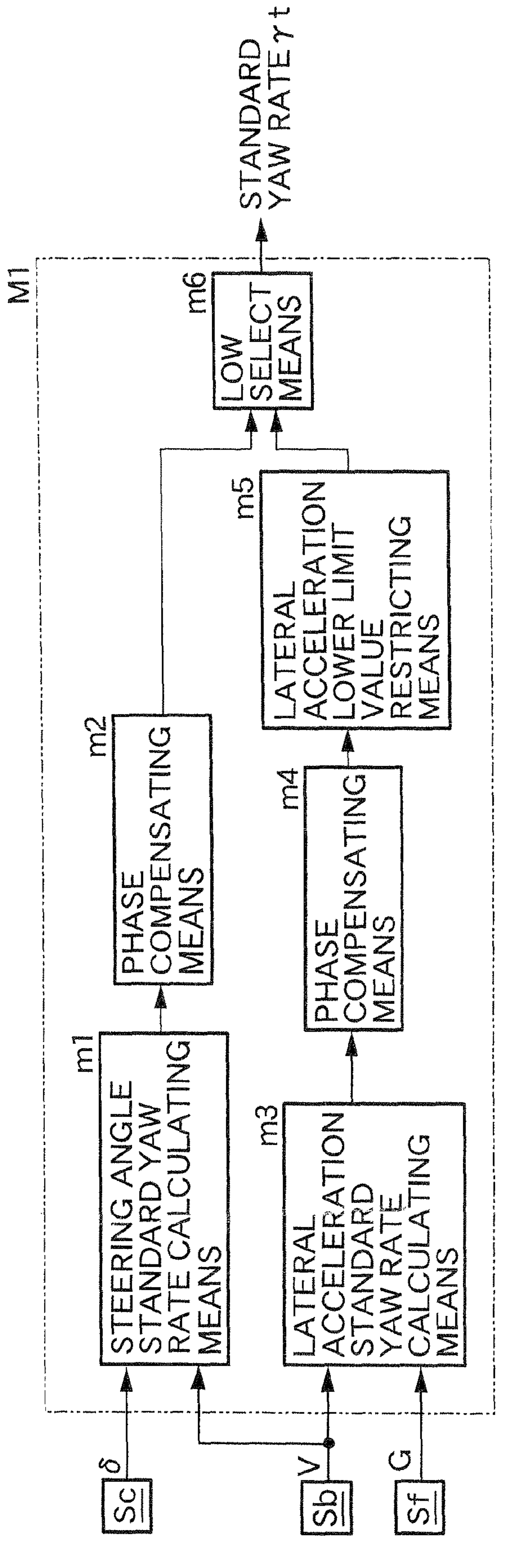
FIGS. 10 to 12 show a fourth embodiment of the present invention.

As is clear from FIG. 10, the standard yaw rate calculating means M1 includes steering angle standard yaw rate calculating means m1, phase compensating means m2, lateral acceleration standard yaw rate calculating means m3, phase compensating means m4, lateral acceleration lower limit value restricting means m5 and low select means m6.

The steering angle standard yaw rate calculating means m1 calculates the steering angle standard yaw rate by multiplying the steering angle δ detected by the steering angle sensor Sc, a predetermined coefficient and the vehicle speed V calculated from the output of the wheel speed sensor Sb, and compensates the deviation of the phase of the steering angle standard yaw rate with the phase compensating means m2. The lateral acceleration standard yaw rate calculating means m3 multiplies the vehicle speed V calculated from the output of the wheel speed sensor Sb and the predetermined coefficient; divides the thus-obtained result by the lateral acceleration G detected in the lateral acceleration sensor Sf to obtain the lateral acceleration standard yaw rate; and compensates the deviation of the phase of the lateral acceleration standard yaw rate with the phase compensating means m4.

Figure 11:
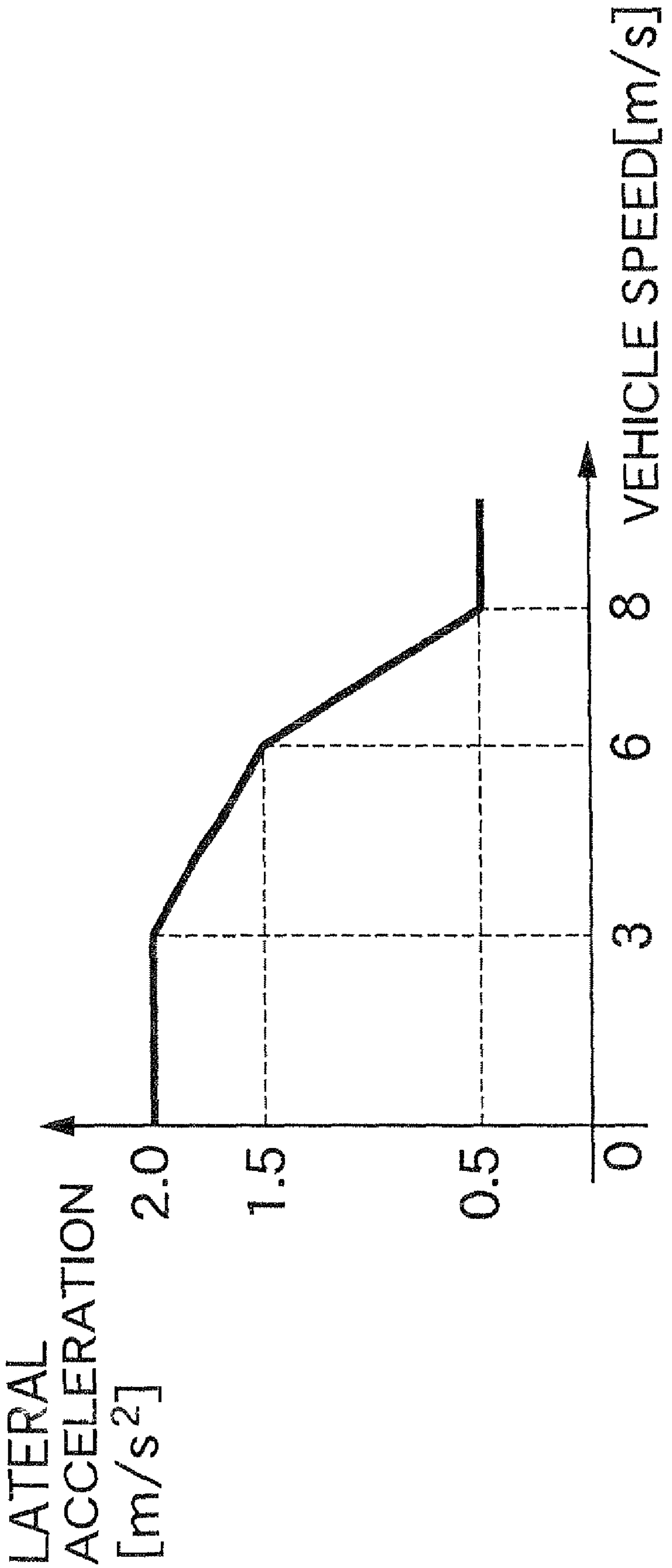

When the lateral acceleration G detected by the lateral acceleration sensor Sf is not more than the lower limit value set in the lateral acceleration lower limit value restricting means m5 shown in FIG. 11, the lateral acceleration standard yaw rate is calculated by using the lower limit value of the lateral acceleration G shown in 11, instead of using the lateral acceleration G detected by the lateral acceleration sensor Sf. Since the lower limit value of the lateral acceleration G is set to be larger as the vehicle speed V becomes smaller, the lateral acceleration standard yaw rate calculated at the time of lower vehicle speed is calculated to be a value larger than the actual value.

Figure 12:
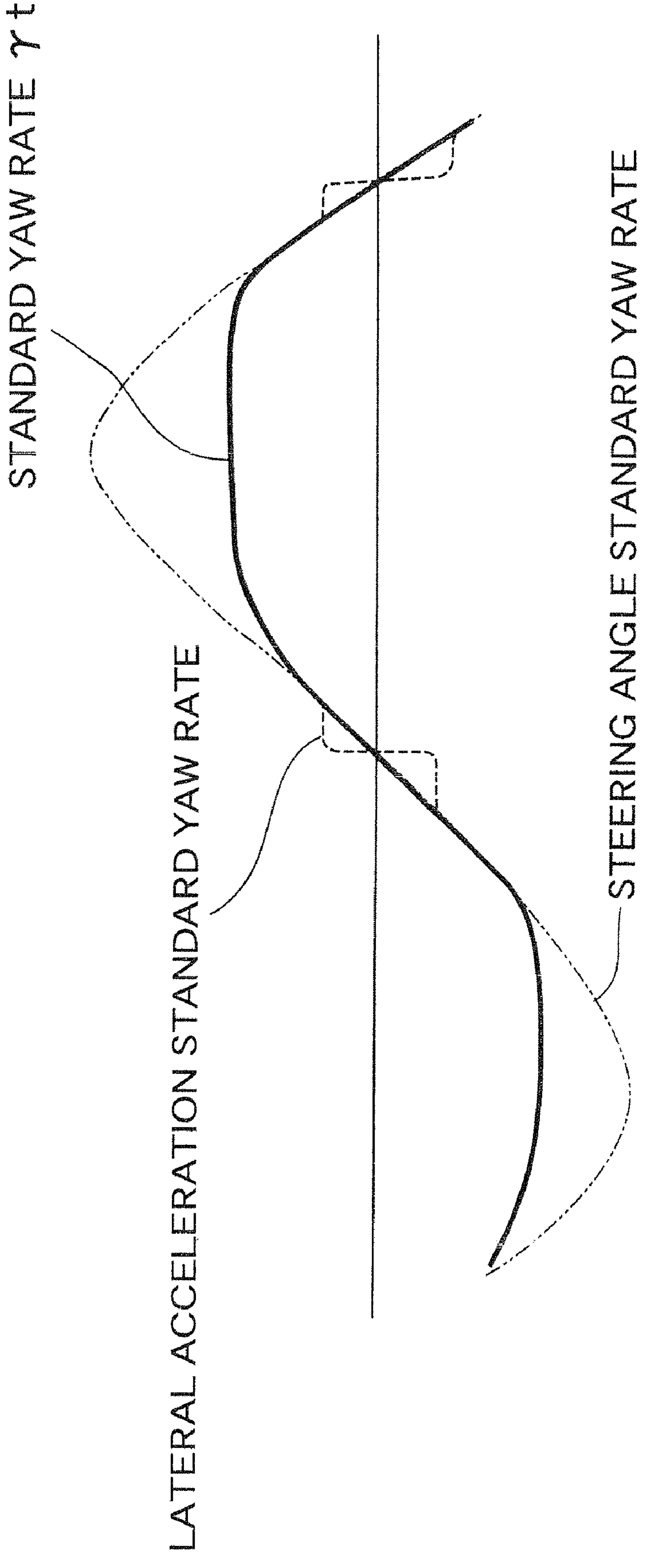

The steering angle standard yaw rate and the lateral acceleration standard yaw rate thus calculated are inputted into the low select means m6, and one of the steering angle standard yaw rate and the lateral acceleration standard yaw rate, that has a smaller absolute value is selected as the final standard yaw rate γt, as shown by the thick solid line in FIG. 12.

On the road surface having a low friction coefficient where a wheel easily skids, the steering angle standard yaw rate tends to be calculated to be a larger value than the actual yaw rate γ, and therefore, if the feedback control is performed with the steering angle standard raw rate set as the standard yaw rate γt, there is a possibility that restriction on the over-steer becomes weak or delayed on the road surf ace having a low friction coefficient. Further, since the lateral acceleration standard yaw rate does not accurately reflect the driving intention (desired traveling direction) of the driver, and therefore, if the feedback control is performed with the lateral acceleration standard yaw rate as the standard yaw rate γt, there is a possibility that the driver feels discomfort.

Thus, in this embodiment, the steering angle standard yaw rate is basically used as the standard yaw rate γt, and when the steering angle standard yaw rate exceeds the lateral acceleration standard yaw rate, the lateral acceleration standard yaw rate is used as the standard yaw rate γt in place of the steering angle standard yaw rate. Therefore, when the steering angle standard yaw rate is calculated to be an excessive value on the road surface having a low friction coefficient, a control corresponding to the road surface friction coefficient is performed using the lateral acceleration standard yaw rate to reliably restrict over-steer and under-steer at an early stage, while reflecting the driving intention of the driver by the steering angle standard yaw rate on a normal road surface.

Since in the region where the vehicle speed V is small, the detected lateral acceleration G is small, a detection error becomes large, and thus an error of the lateral acceleration standard yaw rate calculated based on the lateral acceleration G becomes large. However, according to this embodiment, the lateral acceleration standard yaw rate is calculated to be larger than the actual value by the lateral acceleration lower limit value restricting means m5 at a low vehicle speed, and therefore, the steering angle standard yaw rate becomes smaller than the lateral acceleration standard yaw rate. As a result, the steering angle standard yaw rate is selected as the standard yaw rate γt, thereby preventing a low-accuracy control based on the low-accuracy lateral acceleration standard yaw rate.

Next, a fifth embodiment of the present invention will be described based on FIGS. 13 and 14.

Figure 13:
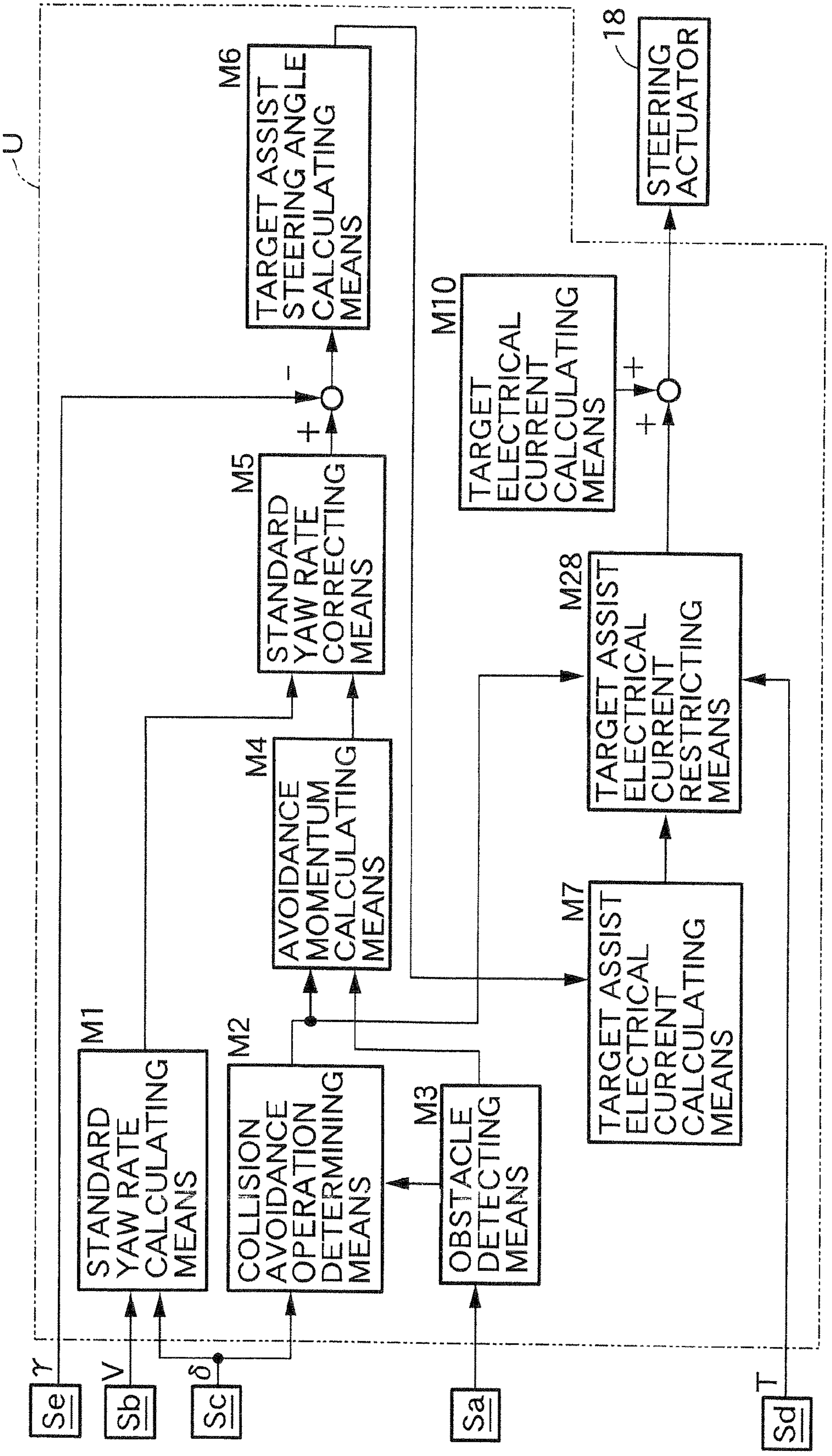
FIGS. 13 and 14 show a fifth embodiment of the present invention.

As shown in FIG. 13, the electronic control unit U includes the standard yaw rate calculating means M1, the collision avoidance operation determining means M2, the obstacle detecting means M3, the avoidance momentum calculating means M4 the standard yaw rate correcting means M5, the target assist steering angle calculating means M6, the target assist electrical current calculating means M7, target assist electrical current restricting means M28 and the target electrical current calculating means M10.

The operation in the normal situation in which the driver does not perform an operation of avoiding an obstacle is the same as in the first embodiment.

Next, an operation during avoidance situation in which the driver performs an operation of avoiding an obstacle will be described.

The basic functions of the standard yaw rate calculating means M1, the collision avoidance operation determining means M2, the obstacle detecting means M3, the avoidance momentum calculating means M4 and the standard yaw rate correcting means M5 during avoidance situation are the same as in the first embodiment.

However, the target assist electrical current restricting means M28 restricts the maximum value of the correction electrical current which is the electrical current conversion value of the target assist steering angle based on the steering torque T detected in the steering torque sensor Sd, when the collision avoidance operation determining means M2 determines the avoidance operation by the driver.

Figure 14:
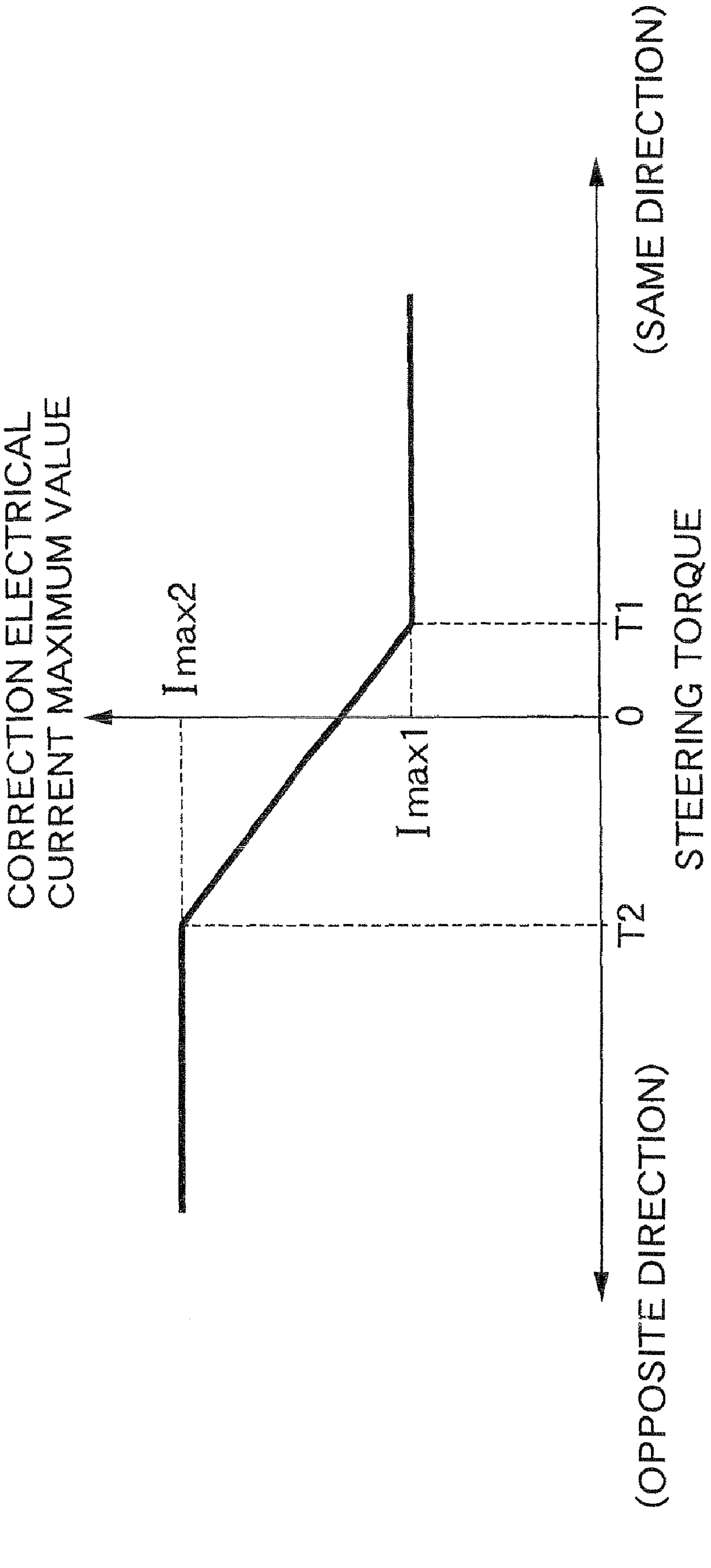

As shown in FIG. 14, when the direction of the steering torque T which the driver inputs into the steering wheel 11 and the direction of the assist electrical current which the target assist electrical current calculating means M7 calculate are the same directions, the maximum value of the correction electrical current is restricted to a low value. Meanwhile, when the direction of the steering torque T which the driver inputs into the steering wheel 11 and the direction of the assist electrical current which the target assist electrical current calculating means M7 calculates are the directions opposite from each other, the maximum value of the correction electrical current is restricted to a high value.

Namely, when the steering torque T is larger than T1 (>0), the maximum value of the correction electrical current is a fixed value of Imax 1, when the steering torque T is smaller than T2 (<0), the maximum value of the correction, electrical current is a fixed value of Imax 2 (>Imax 1), and when the steering torque T is not less than T2 and not more than T1, the maximum value of the correction electrical current linearly decreases from Imax 2 to Imax 1.

Therefore, when the direction of the steering torque T which the driver inputs into the steering wheel 11 and the direction of the assist electrical current which the target assist electrical current calculating means M7 calculates are the same directions, steering assisting force generated by the power steering device 17 is prevented from being too large, thereby avoiding a situation where the turning of the steering wheel 11 becomes too smooth. On the other hand, when the direction of the steering torque T which the driver inputs into the steering wheel 11 and the direction of the assist electrical current which the target assist electrical current calculating means M7 calculates are the directions opposite from each other, the power steering device 17 is caused to generate a sufficient steering resistance force, thereby avoiding a problem that the return of the steering wheel 11 becomes unfavorable due to lack of the steering resistance force.

As a result, disturbance of the vehicle behavior due to excessive assist of the power steering device 17 is prevented, and a feeling of discomfort of the driver due to the deteriorated steering feeling can be eliminated. Further, the steering wheel 11 becomes heavy to inform the driver that steering is in an inappropriate direction to urge the driver to return the steering, thereby performing avoidance of an obstacle and stabilization of the vehicle behavior.

Next, a sixth embodiment of the present invention will be described based on FIG. 15.

In the fifth embodiment, as shown in FIG. 13, when the collision avoidance operation determining means M2 determines the avoidance operation by the driver, the avoidance momentum calculating means M4 calculates the avoidance momentum Dt necessary for avoiding the obstacle O detected by the obstacle detecting means M3, and the standard yaw rate correcting means M5 corrects the standard yaw rate γt calculated in the standard yaw rate calculating means M1 in accordance with the avoidance momentum Dt. Then, the target assist steering angle calculating means M6 calculates the target assist steering angle based on a deviation between the actual yaw rate γ and the standard yaw rate γt, and the target assist electrical current calculating means M7 converts the target assist steering angle into the target assist electrical current which is supplied to the steering actuator 18.

Figure 15:
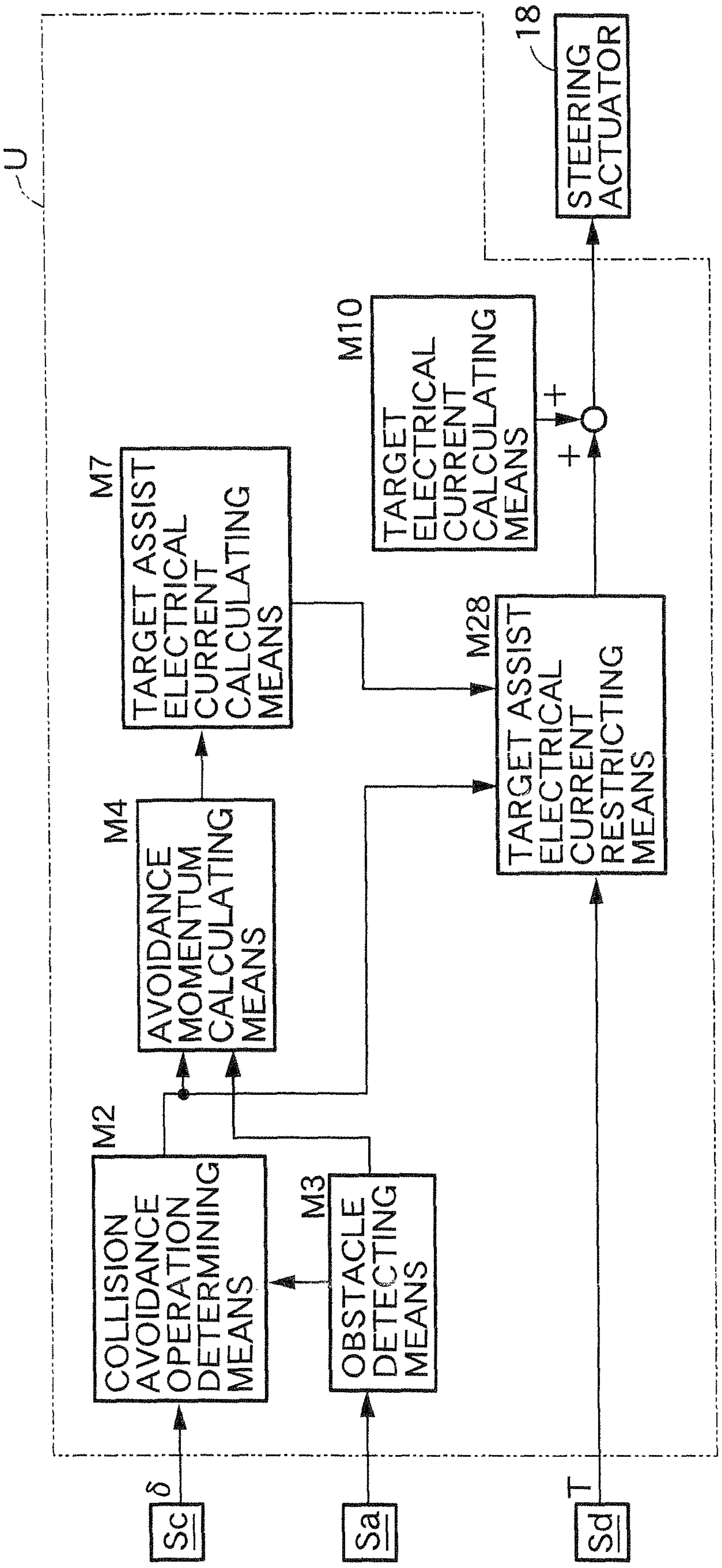
FIG. 15 is a block diagram of a control system of an operation assisting system according to a sixth embodiment.

On the other hand, the sixth embodiment does not includes the standard yaw rate calculating means M1, the standard yaw rate correcting means M5 and the target assist steering angle calculating means M6 of the fifth embodiment as shown in FIG. 15, and the target assist electrical current calculating means M7 directly calculates the target assist electrical current based on the avoidance momentum Dt calculated by the avoidance momentum calculating means M4. The sixth embodiment is the same as the fifth embodiment in the respect that thereafter, when the avoidance operation by the driver is determined, the target assist electrical current restricting means M28 restricts the maximum value of the correction electrical current that is the electrical current conversion value of the target assist steering angle based on the steering torque T.

Thus, according to the sixth embodiment, while achieving the same operational effect as the fifth embodiment, the structure of the control system can be simplified by eliminating the standard yaw rate calculating means M1, the standard raw rate correcting means M5 and the target assist steering angle calculating means M6.

The embodiments of the present invention have been described above, but various modifications in design can be made within the scope of the present invention.

For example, in the embodiments, avoidance of collision with the obstacle O is performed with the front wheel steering by the power steering device 17, but it is also possible to perform avoidance of collision to the obstacle O with the yaw moment generated, by allowing a difference between the braking force of the left wheel and the braking force of the right wheel.

What is claimed is:

1. A vehicle operation assisting system that assists a collision avoidance operation which a driver performs to avoid collision with an obstacle during traveling of a vehicle, comprising:

a standard yaw rate calculating device configured to calculate a standard yaw rate of the vehicle;

a collision avoidance operation determining device configured to determine the collision avoidance operation by the driver;

an obstacle detecting device configured to detect an obstacle with which the vehicle has a possibility of colliding;

an avoidance momentum calculating device configured to calculate an avoidance momentum necessary for avoiding the obstacle detected by the obstacle detecting device when the collision avoidance operation determining device determines the collision avoidance operation by the driver, the avoidance momentum comprising a target lateral moving distance;

a standard yaw rate correcting device configured to correct the standard yaw rate calculated by the standard yaw rate calculating device with the avoidance momentum calculated by the avoidance momentum calculating device;

a target assist electrical current calculating device configured to calculate a target assist electrical current, which is supplied to a steering actuator, based on a yaw rate deviation that is a deviation between the corrected standard yaw rate and an actual yaw rate;

a correcting device configured to reduce the target assist electrical current when an absolute value of the yaw rate deviation is not more than a threshold, and that, when the collision avoidance operation determining device determines the collision avoidance operation by the driver, sets a reduction amount of the target assist electrical current to be smaller than when it does not determine the collision avoidance operation.

2. The vehicle operation assisting system according to claim 1, wherein the standard yaw rate calculating device outputs either smaller one of a steering angle standard yaw rate calculated based on a steering angle, or a lateral acceleration standard yaw rate calculated based on lateral acceleration.

3. The vehicle operation assisting system according to claim 1, wherein the target assist electrical current calculating device corrects the standard yaw rate calculated by the standard yaw rate calculating device so as to have a larger value as it becomes more difficult for the own vehicle to avoid the obstacle based on the avoidance momentum.

4. The vehicle operation assisting system according to claim 1, further comprising a steering angle detector for detecting a steering angle of a steering wheel, wherein the collision avoidance operation determining device determines whether the driver performed a collision avoidance operation based on the steering angle detected by the steering angle detector.

* * * * *